(12) United States Patent
Sherlock et al.

(10) Patent No.: US 9,047,444 B2
(45) Date of Patent: Jun. 2, 2015

(54) MOBILE APPLICATION REGISTRATION

(75) Inventors: Gerard Sherlock, St Albans (GB); John D R Pilkington, Ipswich (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 979 days.

(21) Appl. No.: 12/440,631

(22) PCT Filed: Aug. 8, 2007

(86) PCT No.: PCT/GB2007/003005
§ 371 (c)(1),
(2), (4) Date: Mar. 10, 2009

(87) PCT Pub. No.: WO2008/032010
PCT Pub. Date: Mar. 20, 2008

(65) Prior Publication Data
US 2009/0328144 A1 Dec. 31, 2009

(30) Foreign Application Priority Data
Sep. 14, 2006 (EP) .................................... 06254775

(51) Int. Cl.
*G06Q 99/00* (2006.01)
*G06F 21/10* (2013.01)
(Continued)

(52) U.S. Cl.
CPC ............ *G06F 21/10* (2013.01); *G06F 21/6218* (2013.01); *G11B 20/00086* (2013.01); *G06Q 2220/00* (2013.01); *G06F 21/00* (2013.01); *G06Q 2220/10* (2013.01); *G06Q 2220/18* (2013.01); *G06F 21/123* (2013.01);
(Continued)

(58) Field of Classification Search
CPC ..... G06F 21/00; G06F 21/10; G06F 21/6218; G11B 20/00086; G06Q 2220/00; G06Q 2220/10; G06Q 2220/18
USPC ................................ 705/50, 51, 59; 726/2, 27
See application file for complete search history.

(56) References Cited

U.S. PATENT DOCUMENTS 7,634,262 B1 * 12/2009 Li .................................. 455/419
8,041,342 B2 * 10/2011 Chang ........................ 455/412.2
(Continued)

FOREIGN PATENT DOCUMENTS

| EP | 1 550 930 | 7/2005 |
|---|---|---|
| WO | 2005/084107 | 9/2005 |

OTHER PUBLICATIONS

International Search Report for PCT/GB2007/003005, mailed Jun. 12, 2008.

*Primary Examiner* — James D Nigh
(74) *Attorney, Agent, or Firm* — Nixon & Vanderhye P.C.

(57) ABSTRACT

An application on a mobile terminal in a mobile network is registered with an application server. The mobile terminal includes an identity module. At the application server, a first message is received for registering the application, the first message including a telephone number associated with the identity module. The application server generates a unique identifier and associates the unique identifier with the telephone number. A second message is sent from the application server to the mobile terminal, the second message including the unique identifier. The mobile terminal generates and stores a data block including the unique identifier, a subscriber identity associated with the identity module and a terminal identifier associated with the mobile terminal.

10 Claims, 3 Drawing Sheets

(51) Int. Cl.
*G06F 21/12* (2013.01)
*H04W 4/00* (2009.01)
*H04W 12/06* (2009.01)
*G06F 21/62* (2013.01)
*G11B 20/00* (2006.01)
*G06F 21/00* (2013.01)
*H04L 29/06* (2006.01)

(52) U.S. Cl.
CPC .............. *H04L63/0853* (2013.01); *H04W 4/00* (2013.01); *H04W 12/06* (2013.01)

(56) References Cited

U.S. PATENT DOCUMENTS

| | | | |
|---|---|---|---|
| 8,219,811 B2* | 7/2012 | Roundtree | 713/169 |
| 2004/0209597 A1* | 10/2004 | Myles et al. | 455/410 |
| 2008/0189550 A1* | 8/2008 | Roundtree | 713/176 |
| 2008/0220745 A1* | 9/2008 | Chang | 455/412.2 |
| 2009/0327398 A1* | 12/2009 | Campbell et al. | 709/202 |

* cited by examiner

MOBILE APPLICATION REGISTRATION

This application is the U.S, national phase of International Application No, PCT/GB2007/003005 filed 8 Aug. 2007 which designated the U.S. and claims priority to European Application No. 06254775.7, filed 14 Sep. 2006 the entire contents of each of which are hereby incorporated by reference.

FIELD OF THE INVENTION

This invention relates to a method of registering an application on a mobile device with a service provider, in particular a method of registering an application on a mobile device with an application server in a secure manner.

BACKGROUND TO THE INVENTION

Mobile phones today have the capability of many different applications over that of simply making and receiving telephone phone calls. Some have calendar functions, music players and games, while many have applications that can utilize the mobile phone's ability to connect to the internet using an internet browser, such as instant messaging and download services. These applications may be preloaded onto the phone or downloaded using various techniques. The download methods, so-called "over-the-air" methods, include the well-known WAP-push technique, which allows content and applications to be pushed to a mobile device by providing an encoded SMS message to the device which includes a link to a WAP address for downloading the application.

Many of these applications, in particular those that access services, over the internet, require registration before they can be used. The registration process usually involves setting up of sign-on details, such as usernames and passwords, and providing payment details if the service requires it. This is used to authenticate the user before a service is provided and helps control other functions such as billing. This is particularly important with applications that are provided by a third party over the internet where authentication and billing are critical. Alternatively, users might be asked before they download an application via a web site to pay for the application first and to enter the device serial number (IMEI). This method is most often used by application vendors to tie an application to a particular mobile phone. However, in these cases when the user changes mobile phone, the application has to be downloaded again.

In third party provided applications and services, the third party/vendor will not automatically have access to the user's details that will have been provided to the user's home mobile network, specifically in the home location register. This means that this separate registration process is required, and is typical in most third party provided applications and services, such as music downloads and instant messaging.

From an authentication perspective, it is important to avoid the situation where a user who has registered an application on his mobile device and subsequently loses that device, does not lose too much data associated with that device. If the registration process for an application is "weak", for example in a one-off registration process to activate an application prior to subsequent use, another user could simply insert their SIM card into the lost device and use the registered application at the expense of the genuine user. Even if the application is tied to the serial number of the mobile device, another user could still insert their SIM and use the application, as the device serial number remains unchanged.

BRIEF SUMMARY

It is the aim of embodiments of the present exemplary embodiment to address one or more of the above-stated problems, thereby providing an improved and simplified method for registering an application on a mobile device.

According to one aspect of the present invention, there is provided a method of registering an application on a mobile terminal in a mobile network with an application server, said mobile terminal comprising an identity module, said method comprising the steps of:
 a) receiving at the application server a first message for registering the application, said first message comprising a telephone number associated with the identity module;
 b) generating by the application server a unique identifier and associating the unique identifier with the telephone number;
 c) sending a second message from the application server to the mobile terminal, said second message comprising the unique identifier; and
 d) generating and storing at the mobile terminal a data block comprising the unique identifier, a subscriber identity associated with the identity module and a terminal identifier associated with the mobile terminal.

Preferably, the unique identifier is a universal unique identifier (UUID). The first message originates from the mobile terminal, and may be sent via the mobile network. In such a situation, the telephone number may be the MSISDN associated with the mobile terminal, which is provided in the first message by the mobile network.

The telephone number may be used by the mobile network to route the second message to the mobile terminal, and the telephone number in the first message is provided by the mobile network.

The method may further comprise checking if the subscriber identity stored in the data block is the same as the subscriber identity obtained from the identity module, and checking the terminal identifier stored in the data block against the terminal identifier obtained from the mobile terminal.

Steps a) to d) may be repeated if either of the checks in step e) fail. The application on the mobile terminal may be set to terminate if either of the checks in step e) fail.

The application may use the unique identifier to identify the mobile terminal and the identity module to the application server. This can be done by sending the unique identifier to the application server, which can then be verified.

Preferably, the first and second messages are both short message service messages.

According to another embodiment of the present invention, there is provided a system for registering an application on a mobile terminal in a mobile network, said system comprising an application server, said mobile terminal comprising an identity module, and wherein
 the application server is adapted for receiving a first message for registering the application, said first message comprising a telephone number associated with the identity module, for generating a unique identifier and associating the unique identifier with the telephone number, and for sending a second message to the mobile terminal, said second message comprising the unique identifier;

the mobile device is adapted for generating and storing a data block comprising the unique identifier, a subscriber identity associated with the identity module and a terminal identifier associated with the mobile terminal.

The present exemplary embodiment allows applications registered to a specific mobile device and/or SIM card in the mobile device to be identified. This is very important not only from an authentication and security perspective, but it also allows third parties to lock an application so that it only works with a designated phone number/SIM card. It can do this without having to send any requests to the mobile device's home mobile network, other than those of standard SMS messages. Compare this with known methods for authentication of users by third party application servers/vendors which send requests to the home location register of the home mobile network.

Furthermore, the use of a unique identifier associated with the device, means that the user never has to send the device IMSI over the air, which may compromise security.

The locking of services allows a third party to offer paid-for services to customers of any mobile operator based upon an application which maybe installed on the handset independently of either the mobile phone vendor or the mobile network operator. As many services are provided over an internet connection, which is typically a GPRS connection in most mobile networks, the cost to the user is based on the amount of data transferred. This cost is typically quite reasonable per unit of data transferred using GPRS when used to transfer SMS type messages for example. In the UK, it is possible to send over 1000 SMS size messages using GPRS in 1 MB with a suitable application, and 1 MB with most mobile network operators costs no more than £3-5. Thus each txt can cost as little as 0.3 p for the mobile network charge, with an additional charge by the third party service provider on top, which is a factor of 10 cheaper than the standard mobile network charge for sending a standard SMS message. And in the case where the third party vendor is not a mobile network operator or virtual mobile network operator, this technique allows the vendor to offer paid-for services to a user where they only know the mobile phone number and do not already having a billing relationship with the user like mobile network operators do.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

In examples of the present invention, there is proposed a registration process that automatically creates a user account for an application on a mobile phone. The registration process generates a unique user identifier, which is transmitted to the mobile phone and is used for subsequent authentication of the user with an application server. As the user identifier is fixed to both the subscriber identity associated with the SIM card and the device used during registration, the process prevents the application from being used when a different SIM card is introduced into the phone, even if the application on the phone has already been successfully registered.

Figure 1:
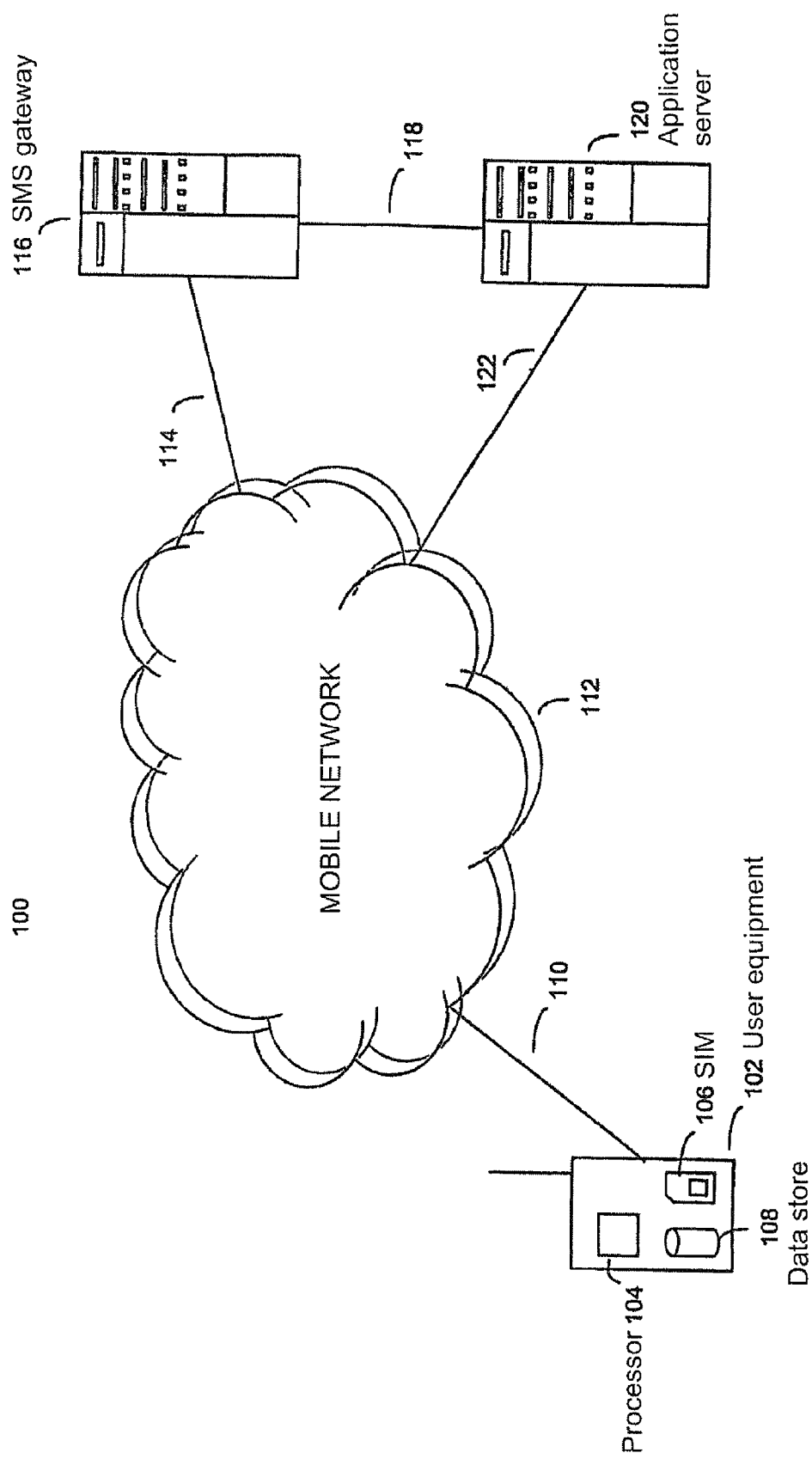
FIG. 1 is a network diagram in an example of the present invention.

FIG. 1 illustrates a network 100 comprising a user equipment 102, such as a mobile phone, a mobile network 112, an SMS gateway 116 and an application server 120. The user equipment 102 can communicate with the mobile network 112 over communications link 110, which is a radio link in this example where the mobile network 112 is GSM, UMTS or similar cellular mobile network. For simplicity, individual components of the mobile network 112, such as base stations and gateways, have been omitted. In this example, the mobile network 112 is the home mobile network associated with the SIM 106 and user equipment 102.

The user equipment 102 includes a processor 104, which is used to control the operation of the device. The user equipment 102 also contains a data store 108, which can be used to store data such as phone numbers, photos and videos, as well as applications that can be run by the processor 104. The subscriber identity module (SIM) 106 in the user equipment 102 holds subscriber information, such as the international mobile subscriber identity (IMSI) which uniquely identifies the subscriber/user to the network. The user equipment 102 also has an associated international mobile equipment identity (IMEI), which is akin to a serial number for the device.

The mobile network 112 can communicate with the SMS gateway 116 over a fixed network connection 114. Similarly, the mobile network 112 can communicate with the application server 120 over a fixed network connection 122. The SMS gateway 116 and the application server 120 can also communicate with each other over a fixed network connection 118.

In this example, the SMS gateway 116 is operated by a third party and is able to receive and send SMS messages to the mobile network 112. The SMS gateway 116 effectively acts as an aggregator for SMS messages to and from the mobile network 112 (illustrated) and other mobile networks (not illustrated). While not illustrated in FIG. 1, the mobile network 112 includes an SMS centre (SMSC), which is the interface between the SMS gateway 116 and the mobile network 112. Communications between the user equipment 102 and the mobile network 112 and within the mobile network 112 are inherently secure due to the security requirements under the GSM standards.

The application server 120 is also operated by a third party, which may or may not be the same as the operator of the SMS gateway 116, and can provide applications and services to the user equipment. For example, the application server 120 can provide applications and services that can be downloaded by the user equipment 102, such as games, music and video download services. At least some of these applications require the user to download an application onto the user equipment 102 first and register that application before subsequent use of it.

Figure 2:
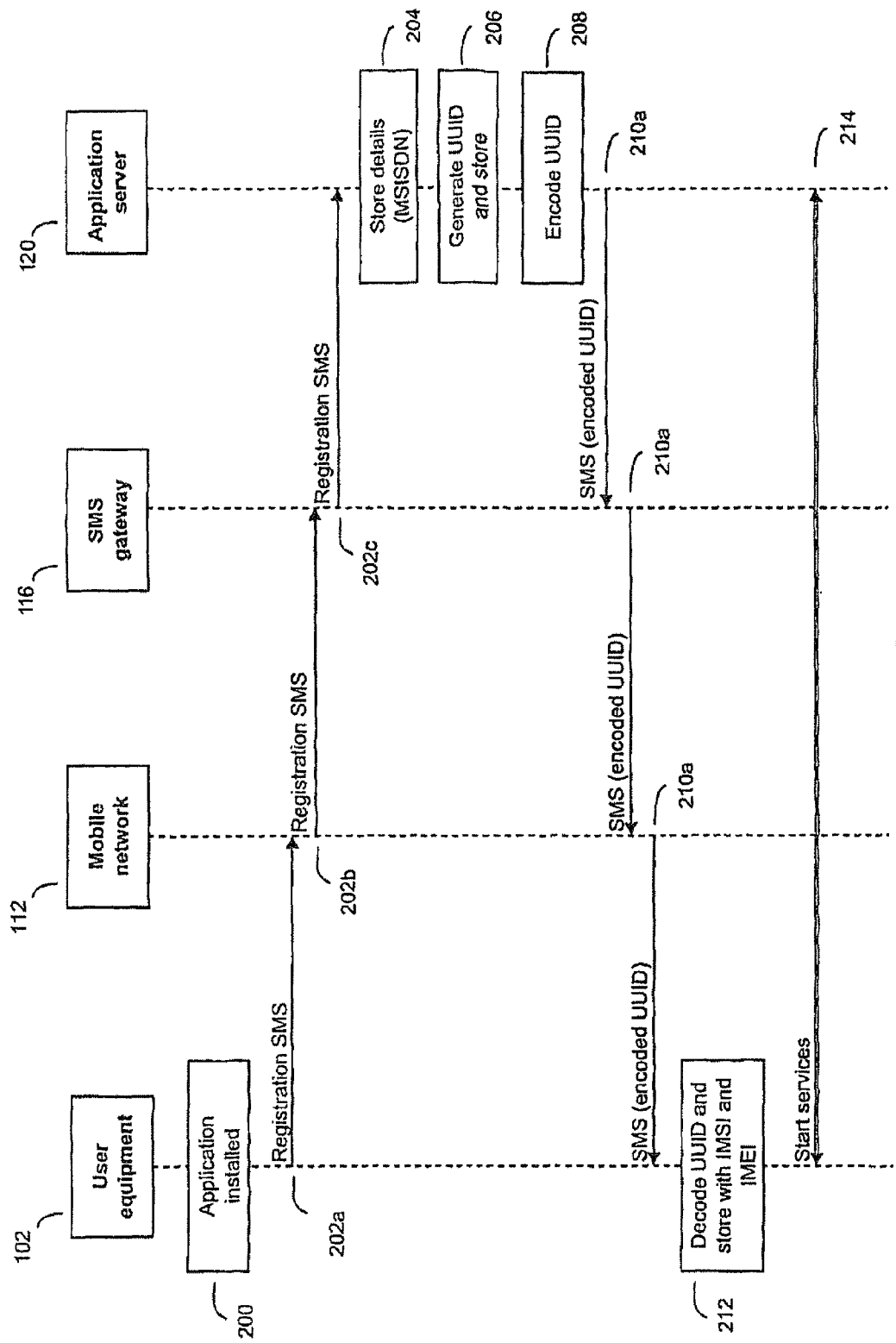
FIG. 2 is a message flow diagram illustrating a registration process in an example of the present invention.

The specific operation of the elements in FIG. 1 in a process for registering an application on the user equipment 102 will be described in more detail below with reference to the message flow diagram of FIG. 2. References in FIG. 2 to the elements found in FIG. 1 are made using like reference numerals.

In step 200, the user equipment 102 already has an application stored in its memory 108. In this example, the application is a music download application, but could be any other application stored on the user equipment 102. The application can be provided in a number of different ways such as by downloading by the user or it can be preloaded on the device. One method of downloading the application is by texting a short code (a form of SMS message) from the user equipment 102 to a third party for the chosen service. This is received by the mobile network 112, which routes it to the relevant SMS gateway 116 for processing. The SMS gateway 116 processes the message and sends a WAP push message back to the user equipment 102. The WAP push message starts the web browser on the user equipment 102 directing the user to the application server 120 for downloading the application.

Once the application is downloaded and installed on the user equipment 102, the user has to register the application with the application server 120. The user first confirms various terms and conditions upon starting up the application for the first time. The application then generates a formatted SMS message containing details associated with the application or service being registered. The details may for example contain text to indicate that this is a first registration and an identifier for the application, version number etc. The SMS message is sent by the user equipment 102 to a short code number or similar number corresponding to the application server 120. The SMS message is first transmitted to the mobile network 112 by the user equipment 102 in step 202*a*.

The mobile network 112 identifies the originator, the user equipment 102, of the SMS registration message and forwards the SMS message onto the SMS gateway 116 in step 202*b*. The SMS message forwarded, specifically by an SMSC (not shown) in the mobile network 112, now includes the telephone number associated with the user equipment 102. This telephone number is more commonly referred to as the mobile subscriber ISDN (MSISDN) number. The MSISDN is added to the SMS message before it is forwarded to the application server 120 via the SMS gateway 116 in steps 202*b* and 202*c*.

The SMS message is first received by the SMS gateway 116 associated with the application server 120. The SMS gateway 116 is connected to the application server 120 through communications link 118, which may be an IP connection for example.

The application server 120 receives the SMS message and stores the message content, including the MSISDN of the user equipment 102, in a customer profile database in step 204.

The application server 120 then generates a unique user identifier that is associated with the stored MSISDN in step 206. In one preferred embodiment, the Universally Unique Identifier (UUID) format is used, through other similarly unique identifiers may be used. The UUID specification is described in more detail in RFC 4122.

The application server 120 may then encrypt the UUID using a strong encryption method. For example, a unique key may be used to encrypt the UUID into a text block, where the key is composed of hashing the MSISDN with a pseudo random generated number. The text block may be 160 characters in length to match the size of an SMS message, though could be more than 160 characters.

In step 210*a*, the text block is sent as an SMS message back to the user equipment 102 by the application server 120 via the mobile network 112. The application server 120 uses the MSISDN obtained from the registration message to send the text block back to the user equipment 102. This step enables the originating user equipment 102 to be verified as being genuine and avoid the situation where the user sends a registration SMS message with a tampered MSISDN, IMSI or similar to deceive the system. By using the present method, the mobile network 112 will ensure that the response is directed to the correct user equipment 102 associated with the MSISDN.

The user equipment 102 then decodes the received text block using the application to extract the information which may contain the UUID in step 212. The application remains running after the sending of the registration SMS in step 202*a* and waits for this return SMS from the application server 120. The application has a reverse algorithm for decoding the text block if it has been encoded. The application then stores the extracted UUID in a data block, which can be encrypted, in the memory 108 together the IMSI of the SIM 106 and the IMEI of the user equipment 102. The application includes an interface or similar that allows the application to interrogate the SIM 106 and the user equipment 102 for the IMSI and the !MEI, respectively.

The registration process is now complete and the application on the user equipment 102 can be used to access services provided by a third party from the application server 120 in step 214. These services will generally be accessed over a GPRS or similar data connection over the mobile network 112. These services may for example be a music download service from the application server 120.

Figure 3:
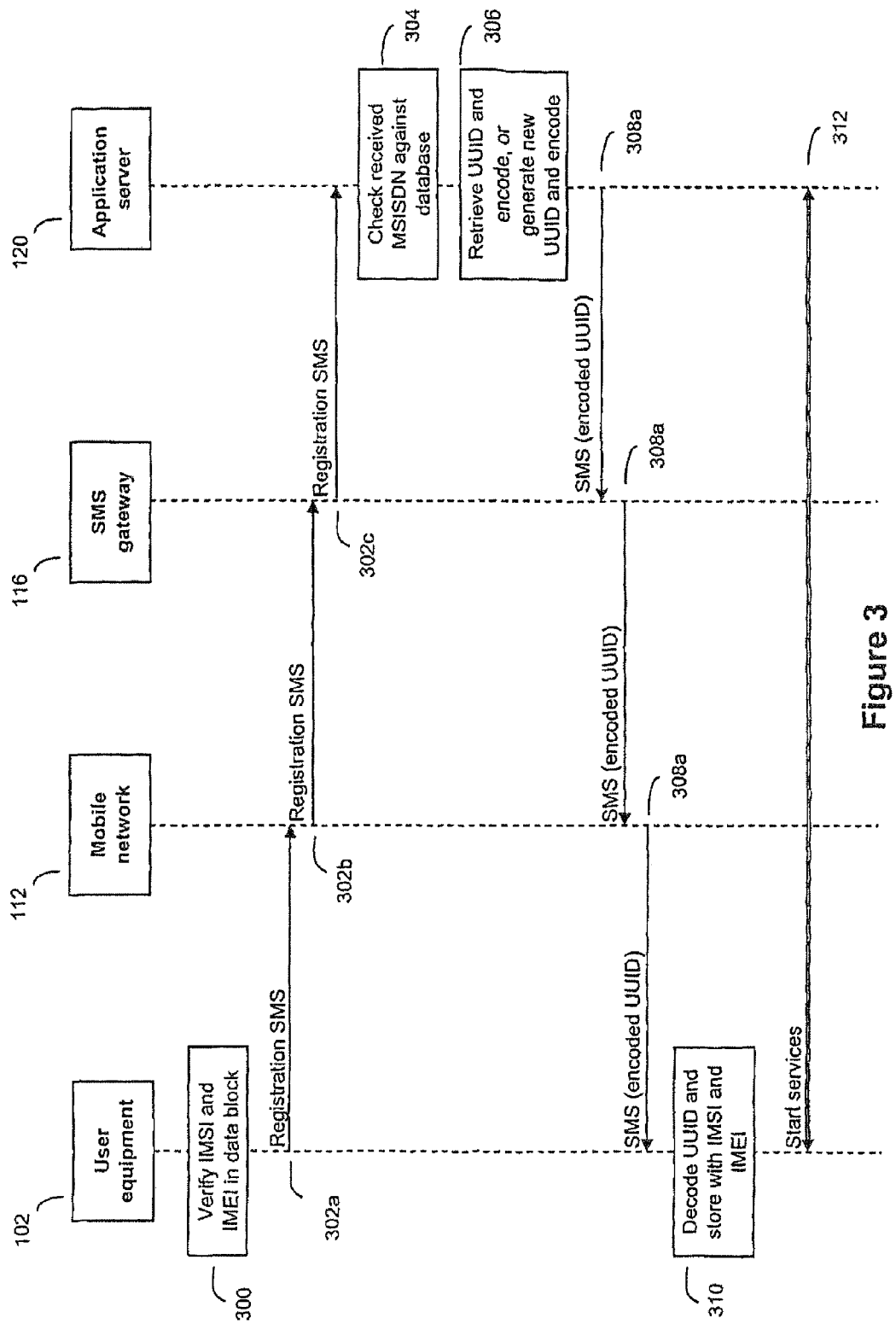
FIG. 3 is a message flow diagram illustrating a subsequent authentication process in an example of the present invention.

FIG. 3 illustrates a message flow diagram of when a user next starts the application on his user equipment 102 to access services from the application server 120. The present invention performs an authentication sequence to ensure that neither the SIM nor the user equipment 102 has changed since the initial registration. This may be due to the user moving the SIM 106 from an old device to a new device, or when the user equipment 102 stays the same, but a new SIM is inserted.

In step 300, the user starts the application on the user equipment 102, which verifies the data block stored in the memory 108. This is done by decrypting the data block and then checking the decrypted IMSI and IMEI with the IMSI and IMEI from the SIM 106 and the user equipment 102, respectively. The application can interrogate the SIM 106 and the user equipment 102 to obtain the IMSI and IMEI, respectively. If the IMSI and IMEI are verified, then the application can assume that the UUID in the data block is valid and correct for the IMSI/IMEI combination as verified.

However, if the check fails, then the application can be set to delete the data block and either restart the registration process (from step 200) or close the application. This may occur for example if the SIM card 106 has been replaced in the user equipment 102 with that belonging to another user, resulting in a change of IMSI. If the IMSI has changed due to a new SIM card in the user equipment 102, then the application can be configured to allow the performance of the above registration process again to register the new SIM with the application server 120.

The application may also be set to terminate in the case where the IMEI has changed. This might occur if the IMEI of the user equipment 102 has been tampered with, or where the data block on the user equipment 102 associated with the IMEI has been altered. This might be an indication of possible attempt of fraudulent use.

The remainder of FIG. 3 shows the re-registration process that is initiated by the application when the check in step 300 fails.

In step 302*a*, the application causes the user equipment 102 to send a new registration SMS message of the same format and content as that sent in step 202*a*. This SMS message, which includes the MSISDN of the user equipment 102, is received by the application server 120. In step 304, the application server 120 checks the customer profile database to see if the MSISDN has previously been registered. If the MSISDN already exists in the database, then the associated UUID is retrieved and encoded in step 306. Alternatively, if the MSISDN is not present in the database, or even if it is, a new UUID can be generated by the application server 120 and encoded in step 306 instead. Generation of a new UUID is preferable, especially during a registration or re-registration process as it ensures that the UUID is unique for a given combination of IMSI/IMEI.

In step 308a, the encoded UUID is transmitted to the user equipment 102 identified by the MSISDN. In step 310, the UUID is decoded and stored with the current IMSI and IMEI in a code block in the user equipment 102 as in corresponding step 212. Once the new code block has been generated and stored locally at the user equipment 120, services can start between the user equipment 102 and the application server 120.

If the user is using a new phone with an existing SIM card that has previously been registered with the application server, then steps 304 and 306 may replace steps 204, 206 and 208, as the MSISDN received in the registration SMS will already exist in the customer profile database.

Several additional features may be incorporated into the system. For example, if for some reason the application does not get an SMS back from the application server 120 in the registration process (step 210a not effected), then the application may be set to terminate after a predetermined period of time. The application may then give the user an opportunity to retry registration.

Furthermore, the application can also be adapted to send the UUID to the application server 120. One use for this is for handling and verifying payments. By associating user, specifically the MSISDN, to a UUID, all communications between the user equipment 102 and the application following registration can make use of the UUID instead of the MSISDN. Thus, the UUID can be passed over a secure datalink, such as a suitable IP connection (e.g. https) over the mobile network 112, to the application server. This can then be used for making payments to an account without having to divulge MSISDN or other details such as IMSI and IMEI.

Similarly, the application can use the UUID to check, as and when required, whether the user has sufficient "credit" to pay for service before the application provides that service. This is important for services that require a regular subscription be paid up before the service is provided. The UUID can therefore act as a key for retrieving a customer record containing the relevant information.

One important aspect of the exemplary embodiment is that it allows a service provider with no prior relationship with a user to secure an application to a mobile phone and IMSI using only APIs associated with the phone and an SMS "handshake". This differs from the methods used by mobile network operators to achieve a similar aim.

In another aspect of the exemplary embodiment, instead of the application server 120 sending the UUID to the user equipment 102 in an SMS message, the SMS message can instead contain a URL and a "temporary" UUID. This "temporary" UUID may only be valid for a short period of time, and the URL points to a web page managed by the application server 120.

The application on the user equipment 102, once it has received this alternative SMS message, can use a secure browser connection (e.g. an HTTPS connection) to access the URL and transfer the "temporary" UUID to the application server 120, which then checks that access is valid by checking the UUID transferred against that originally generated by the application server 120.

If the application server determines that the transferred UUID is the same as the UUID originally generated by the application server 120, then the application server 120 can return a data block over the secure connection containing authentication or configuration data, including a "permanent" UUID and a further URL which can be used by the application on the user equipment 102 to check if this new data block is valid in a subsequent check. By checking the UUID using the URL provided on a regular basis, the application can determine if the user's account is still valid. If it is, then the existing data block is returned to the application from the application server 120, and the service can continue. If the account is no longer valid, for example if a free trial period has expired or if a bill has not been paid, then a blank data block is returned which disables the service on the application.

In summary, examples of the present invention utilize the inherently secure framework provided by the mobile network operator to provision a UUID that is associated with a user and his device. In particular, it is the security of the SMS mechanism that ensures the security of this exemplary embodiment.

While the download of an application and subsequent registration are described with reference to the same SMS gateway 116 and application server 120 as those used in subsequent provision of services, the examples are equally applicable to the use of separate gateways and servers for each process.

In general, it is noted herein that while the above describes examples of the invention, there are several variations and modifications which may be made to the described examples without departing from the scope of the present invention as defined in the appended claims. One skilled in the art will recognize modifications to the described examples.

What is claimed is:

1. A method of registering an application on a mobile terminal in a mobile network with an application server, said mobile terminal comprising a subscriber identity module (SIM), said method comprising:
   a) receiving at the application server a first message for registering the application, said first message comprising a telephone number associated with the SIM;
   b) subsequently generating at the application server a unique identifier and associating the unique identifier with the telephone number;
   c) still later, sending a second message from the application server to the mobile terminal, said second message comprising the unique identifier;
   d) generating and storing in a non-transient memory medium at the mobile terminal an unencrypted data block comprising (i) the unique identifier, (ii) a subscriber identity associated with the SIM and (iii) a terminal identifier associated with the mobile terminal;
   e) thereafter, before permitting use of the thus-registered application, (1) directly comparing, at the mobile terminal using only data locally stored therein, the unencrypted subscriber identity locally stored in the data block with the unencrypted subscriber identity locally obtained from the SIM to determine whether they match and (2) also directly comparing, at the unencrypted mobile terminal using only data unencrypted locally stored therein, the data block with the unencrypted terminal identifier locally obtained from the mobile terminal to determine whether they match; and
   f) permitting use of the registered applications only when a match is determined by both of the comparing steps in order to prevent use of the registered application with a different SIM or with tampered identity data.

2. A method according to claim 1, further comprising:

before step f), determining whether there is no match resulting from either of the comparisons in step e) and, based on a determination that there is no match, repeating steps a) to d).

3. A method according to claim 1, further comprising:

determining whether there is no match resulting from either of the comparisons in step e) and, based on a determination that there is no match, deleting the data block.

4. A method according to claim 1, wherein the registered application uses the locally stored unique identifier to identify the mobile terminal and the SIM to the application server.

5. A method according to claim 1, wherein the first and second messages are sent over the mobile network.

6. A method according to claim 5, wherein the first and second messages are short message service messages.

7. A method according to claim 1, wherein the telephone number is used by the mobile network to route the second message to the mobile terminal, and the telephone number in the first message is provided by the mobile network.

8. A method according to claim 1, wherein the first and second messages are communicated between the mobile terminal and the application server using secure communications methods.

9. A method according to claim 1, wherein the first message originates from the mobile terminal.

10. A system for registering an application on a mobile terminal in a mobile network, said system comprising:

an application server configured to communicate with a mobile terminal comprising a subscriber identity module (SIM), the application server being configured (a) to receive a first message to register an application, said first message comprising a telephone number associated with the SIM, (b) to generate a unique identifier and to associate the unique identifier with the telephone number, and (c) to send a second message to the mobile terminal, said second message comprising the unique identifier;

the mobile device being configured to generate and store in a non-transient memory medium an unencrypted data block comprising (i) the unique identifier, (ii) a subscriber identity associated with the SIM and (iii) a terminal identifier associated with the mobile terminal; and said mobile terminal being further configured, when attempting to use the thus-registered application, using only data locally stored therein, to locally and directly (1) compare the unencrypted subscriber identity locally stored in the unencrypted data block with the unencrypted subscriber identity locally obtained from the SIM to determine whether they match and (2) to also locally and directly compare the unencrypted terminal identifier locally stored in the unencrypted data block with the unencrypted terminal identifier locally obtained from the mobile terminal to determine whether they match; and to permit use of the registered application only when a match is determined by both of the compare operations thereby preventing use of the registered application with a different SIM or with tampered identity data.

\* \* \* \* \*